United States Patent [19]

Hodge

[11] Patent Number: 5,038,650
[45] Date of Patent: Aug. 13, 1991

[54] MITER SAW SUPPORT AND EXTENSION

[76] Inventor: Larry E. Hodge, 212 W. Albemarle Dr., Nags Head, N.C. 27959

[21] Appl. No.: 482,863

[22] Filed: Feb. 22, 1990

[51] Int. Cl.$^5$ .......................... B25H 1/04; B25H 1/12
[52] U.S. Cl. .................................. 83/471.3; 83/477.2; 83/581; 108/38; 144/286 A; 144/287
[58] Field of Search .................. 83/471, 471.2, 471.3, 83/473, 574, 581, 859, 701, 783, 477.1, 477.2; 144/286 R, 286 A, 287; 108/38, 34, 55, 69; 30/124

[56] References Cited

U.S. PATENT DOCUMENTS

| 3,628,578 | 12/1971 | Berg | 83/471.3 |
|---|---|---|---|
| 3,695,189 | 10/1972 | Felder, Jr. | 108/65 |
| 3,872,755 | 3/1975 | Marsh et al. | 83/471.3 |
| 4,335,765 | 6/1982 | Murphy | 144/286 R |
| 4,519,280 | 5/1985 | Cook | 83/574 |
| 4,561,336 | 12/1985 | Davis | 83/859 |
| 4,694,720 | 9/1987 | Brickner, Jr. et al. | 83/471.3 |
| 4,798,113 | 1/1989 | Viazanko | 83/471.3 |
| 4,817,693 | 4/1989 | Schuler | 83/471.2 |
| 4,860,807 | 8/1989 | Vacchiano | 83/574 |
| 4,890,657 | 1/1990 | Shelhorse | 83/471.3 |

Primary Examiner—Douglas D. Watts
Assistant Examiner—Kenneth E. Peterson
Attorney, Agent, or Firm—Fleit, Jacobson, Cohn, Price, Holman & Stern

[57] ABSTRACT

A horizontally elongated base member is provided as well as a pair of horizontally elongated extension members. The extension members are removably mounted from opposite end portions of the base member in coextensive, longitudinally spaced relation with the spaced adjacent ends of the extension members exposing a center portion of the base member from above and the remote ends of the extension members projecting considerably beyond corresponding ends of the base member. A cut off saw is removably receivable on the center portion of the base member between the adjacent ends of the extension members with the slotted table of the cut off saw coextensive with the upper surfaces of the extension members and, after the cut off saw has been removed, the extension members are detachable from the end portions of the base member, positionable in superposed relation and resecurable in position overlying the base member to provide a considerably foreshortened assembly for compact storage and transport.

20 Claims, 3 Drawing Sheets

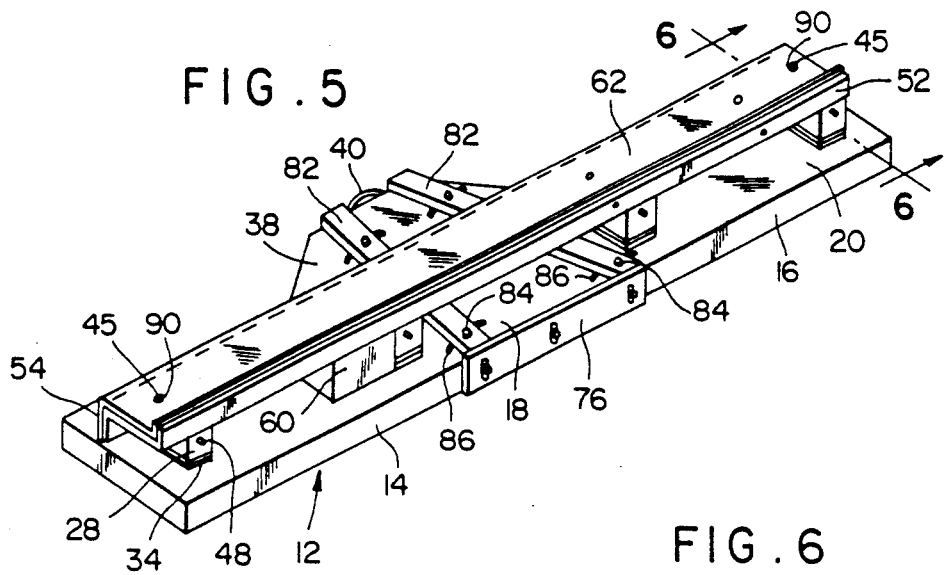
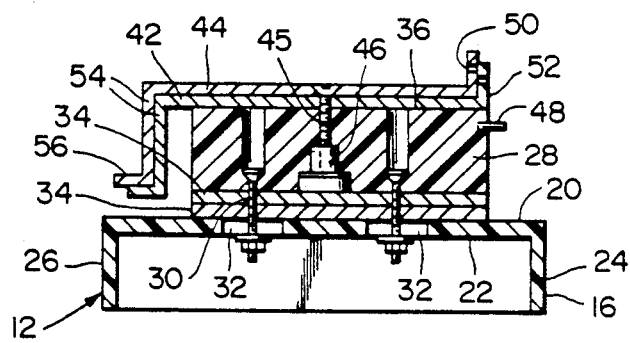
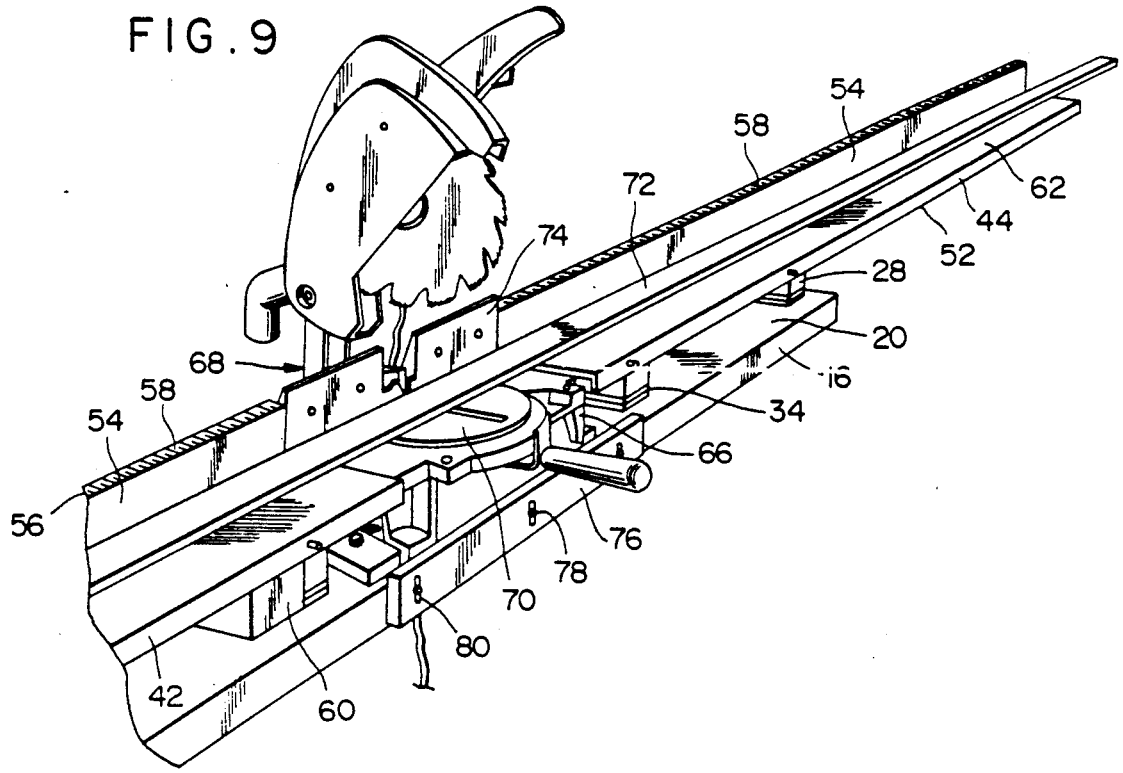

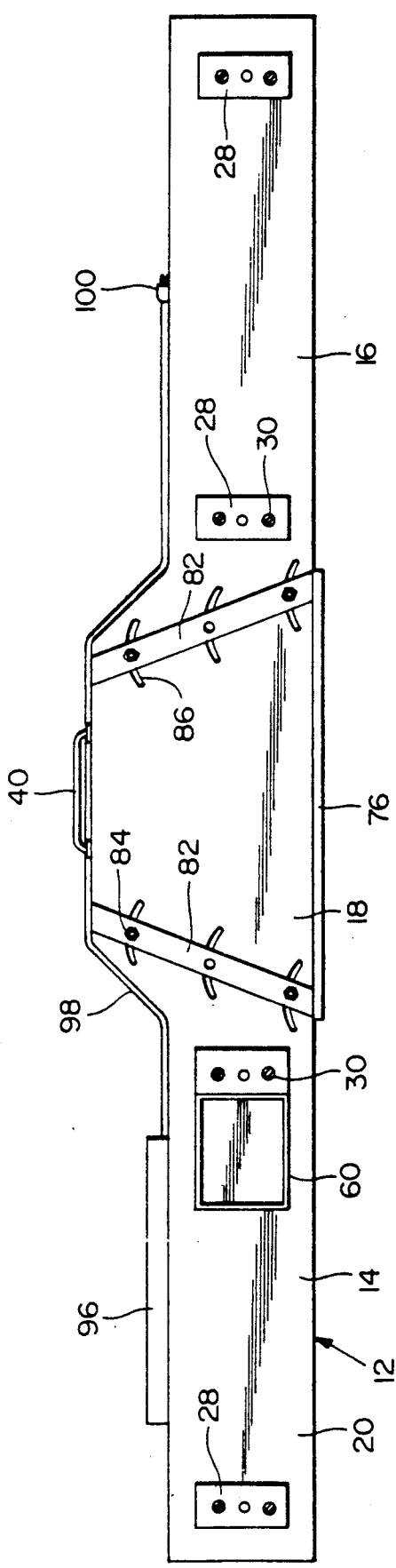
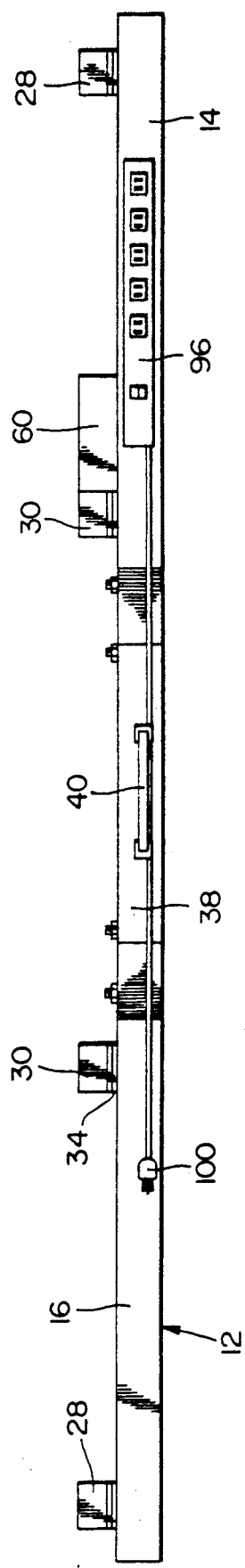

MITER SAW SUPPORT AND EXTENSION

BACKGROUND OF THE INVENTION

1. Field of the Invention

This invention relates to a horizontally elongated base member and a pair of horizontally elongated extension members secured to opposite end portions of the base member in longitudinally aligned and spaced relation with the spacing between the adjacent ends of the extension members exposing a center portion of the base member for access from above and the remote ends of the extension members projecting considerably outwardly beyond the corresponding ends of the base member. The center portion of the base member includes structure for removably supporting the base of a miter of cut-off saw therefrom with the upper surface of the slotted table of the saw horizontally aligned with the upper surfaces of the extension members and the extension members are removable from the opposite end portions of the base member and remountable upon the latter in superposed relation relative to each other and the base member in order to provide a considerably foreshortened assembly for ease of transport and storage.

2. Description of Related Art

Various different forms of extensions for work supporting tables, construction tables and supports for miter saws heretofore have been provided such as those disclosed in U.S. Pat. Nos. 3,695,189, 4,335,765, 4,561,336, 4,694,720 and 4,798,113. However, these various forms of previously known devices do not include the overall combination of structural and operational features of the instant invention.

SUMMARY OF THE INVENTION

The miter saw support and extension of the instant invention includes an apparatus which, in conjunction with a suitable support such as a pair of saw horses, may be readily stored, transported to and from and carried about a construction site for the purpose of making accurate miter cuts in various different forms of elongated workpieces.

The miter saw support and extension has been specifically designed to provide a readily storable and transportable device to be used by carpenters and the like at a work site and with the miter saw support and extension being totally self contained and readily usable in an efficient manner.

The main object of this invention is to provide a miter saw support and extension which, when erected, may be utilized to make miter cuts in very long workpieces and which is transformable into a compact state for ease in transport and convenience of storage.

Another object of this invention is to provide a miter saw support and extension including structure for supporting different makes of miter saws therefrom provided with different bases and including workpiece supporting tables disposed at different heights relative to the lower extremities of the bases.

Still another object of this is to provide a miter saw support and extension constructed in a manner such that the extensions thereof include work face engaging fences and wherein the extensions may be laterally adjusted relative to a base supported miter saw so as to align the aforementioned extension fences with an attendant miter saw base fence.

A further object of this invention is to provide a miter saw support and extension constructed in a manner such that it may be readily supported from a pair of sawhorses.

Yet another object of this invention is to provide a miter saw support and extension including extension fences having measuring indicia operatively associated therewith.

A final object of this invention to be specifically enumerated herein is to provide a miter saw support and extension in accordance with the preceding objects and which will conform to conventional forms of manufacture, be of simple construction and easy to use so as to provide a device that will economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is a perspective view of the assembly with the extensions thereof superposed relative to each other and releasably mounted from the base of the assembly for compact storage and transport;

FIG. 6 is an enlarged fragmentary transverse vertical sectional view taken substantially upon the plane indicated by the section line 6—6 of FIG. 5;

FIG. 7 is an enlarged top plan view of the base of the assembly with the extensions therefore removed;

FIG. 8 is a rear elevational view of the base of the assembly with the extensions removed; and FIG. 9 is a fragmentary perspective view of the assembly with a miter saw operatively supported therefrom and an elongated workpiece supported from the assembly and the miter saw in position to have a saw cut made therethrough.

DESCRIPTION OF THE PREFERRED EMBODIMENT

Figure 1:
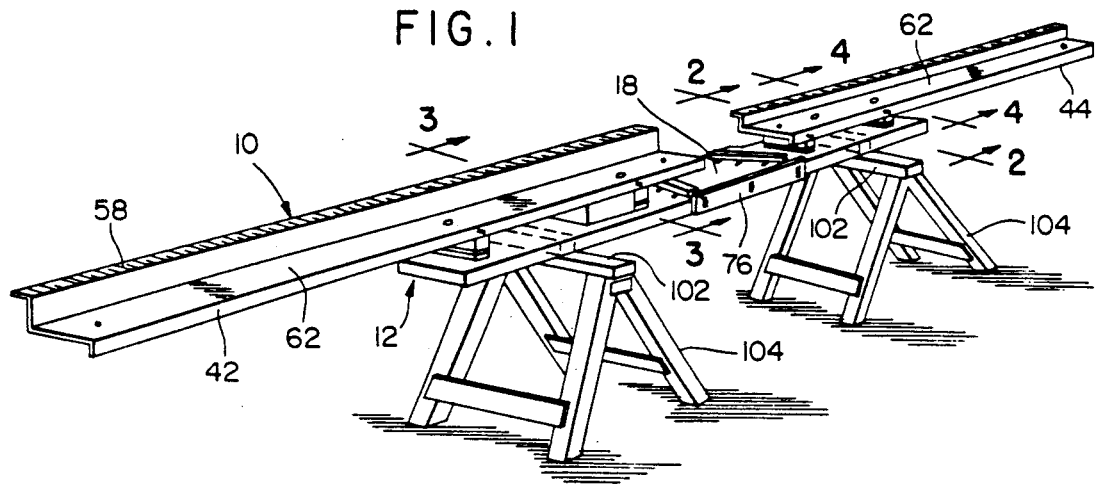
FIG. 1 is a perspective view of a miter saw support and extension assembly constructed in accordance with the present invention and mounted in operative position from a pair of sawhorses.

Referring now more specifically to the drawings the numeral 10 generally designates the miter saw support and extension assembly of the instant invention. The assembly 10 includes a horizontally elongated base member referred to in general by the reference numeral 12 including opposite end portions 14 and 16 as well as a center portion 18 disposed between the end portions 14 and 16. In addition, the base member includes upper and lower sides 20 and 22 and front and rear sides 24 and 26. Each end portion includes a pair of longitudinally spaced spacing members 28 secured thereto through the utilization of fasteners 30 secured through corresponding pairs of transverse slots 32 formed in the end portion and each spacing member 28 may have one or more shims 34 disposed therebeneath between the spacing member 28 and the upper side 20 of the corresponding end portion. The shims 34 may be used to elevate the upper surfaces 36 of the spacing members 28 to a predetermined elevation above the upper surface 20.

The base member 12 is constructed of fiberglass or a suitable impact resistant plastic and includes a longitudinal central integral projection 38 on its rear side forming a rearward continuation of the upper surface 20 centrally intermediate the opposite ends of the base member 12 and the projection 38 includes a handle 40 which may be used to carry the base member 12.

A pair of extension members 42 and 44 are removably supported from corresponding pairs of spacing members 28 through the utilization of fasteners 45 threadedly engaged in nuts 46 upwardly recessed into the lower portions of the spacing members 28, the slots 32 and fasteners 30 enabling front to rear adjustable shifting of the spacing members 28 relative to the base member 12.

The front sides of the spacing members 28 include horizontally outwardly projecting locating pins 48 receivable in apertures 50 formed in downwardly directed front flanges 52 of the extensions 42 and 44 and the latter include rear upwardly directed vertical flanges 54 defining aligned workpiece fences, the upper ends of the flanges 54 terminating in horizontally rearwardly directed flanges 56 having indicia 58 spaced therealong. Also, the end portion 14 includes an upwardly opening storage box 60, see FIG. 3, whose open upper end is closed by the extension 42. Furthermore, each extension 42 and 44 includes a horizontal web 62 extending between the corresponding flanges 52 and 54, the webs 62 defining support surfaces for workpieces spanning between the extensions 42 and 44.

The center portion 18 of the base member 12 is exposed from above between the adjacent ends of the extensions 42 and 44, see FIG. 1, and defines a location on the upper surface 20 upon which to receive the footed base 66 of a miter or cut off saw referred to in general by the reference numeral 68, the saw 68 including a slotted support table 70 horizontally registered with the upper surfaces of the webs 62 for support of the workpiece 72 to be cut. The base 66 of the saw 68 further includes an upstanding fence 74 to be positioned coextensive with the fence defining flanges 54 of the extensions 42 and 44.

The height of the support table 70 above the depending feet of the base 66 determines the number and thickness of shims 34 to be used in spacing the spacing members 28 above the upper surface 20 of the end portions 14 and 16.

The front side 24 of the center portion 18 includes a vertically adjustable fence or clamp bar 76 supported therefrom through the utilization of fasteners 78 secured through vertical slots 80 formed in the fence 76 and after the base 66 has been properly positioned relative to the center portion 18, the fence 76 is adjusted upwardly to prevent forward shifting of the base 66 of the saw 68 relative to the base member 12. In addition, a pair of clamp and positioning bars 82 extending in front-to-rear directions over the center portion 18 are supported therefrom through the utilization of fasteners 84 secured through arcuate slots 86 formed in the center portion 18. Thus, the bars 82 may be laterally shifted relative to each other as well as secured in adjusted rearwardly convergent positions for abutting engagement by the base 66 of the saw 68 to define a rearward most shifted position of the saw 68 relative to the center portion 18 of the base member 12.

With attention now invited more specifically to FIGS. 5 and 9 of the drawings, when the assembly 10 is to be inoperative, stored, or transported, the fasteners 45 may be removed in order that the extension 42 and 44 may be shifted forwardly relative to the corresponding spacing members 28 to be disengaged therewith. Then, the extension 44 may be inverted, end-to-end, over all four spacing members 28 and the extension 44 may be end-to-end inverted over the extension 42 in the manner illustrated in FIG. 6 and the fasteners 45 may be reinstalled through additional openings 90 formed in the extensions 42 and 44 in order to secure the nested extensions 42 and 44 to the endmost spacing members 28. The box 60 is also closed from above by the nested extensions 42 and 44 and, before the last mentioned fasteners 45 are reinstalled, the other fasteners 45 as well as other small accessories may be placed within the box 60 so as to be closed therein when the extensions 42 and 44 are secured to the endmost spacing members 28 in the manner illustrated in FIG. 6. Of course, before the extensions 42 and 44 are positioned as illustrated in FIG. 6, the saw 68 is removed from the assembly 10.

Figure 3:
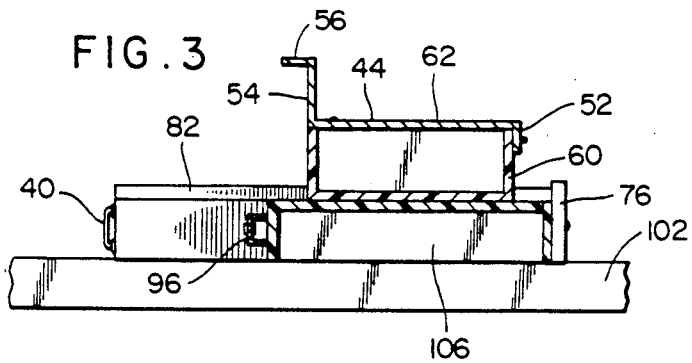
FIG. 3 is an enlarged fragmentary transverse vertical sectional view taken substantially upon the plane indicated by the section 3—3 of FIG. 1.
Figure 4:
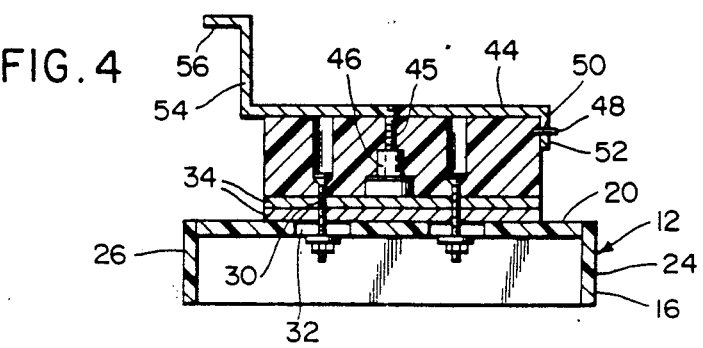
FIG. 4 is an enlarged fragmentary transverse vertical sectional view taken substantially upon the plane indicated by the section line 4—4 of FIG. 1.

It is also to be noted from FIGS. 3, 7 and 8 of the drawings that an electrical plug receptacle 96 is secured to the rear side 26 of the end portion 14, the receptacle 96 including an extension cord 98 having an electrical plug 100 on its free end.

Figure 2:
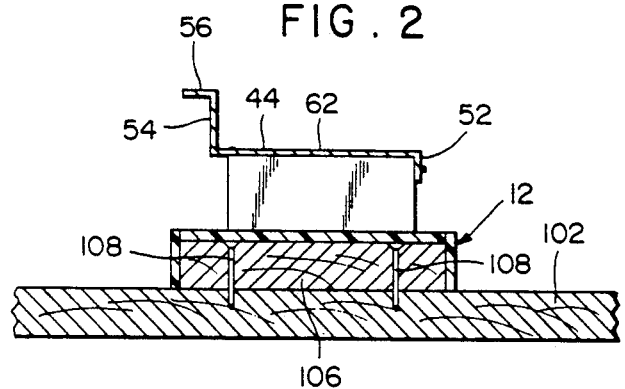
FIG. 2 is an enlarged transverse vertical sectional view taken substantially upon the plane indicated by the section line 2—2 of FIG. 1.

With attention now invited more specifically to FIGS. 1 and 2, it may seen that the upper horizontal members 102 of a pair of saw horses 104 have short pieces 106 of lumber secured thereto through the utilization of nails 108 and that the pieces 106 are of a length to be snugly received within the downwardly opening lower side of the end portions 14 and 16. Therefore, the base member 12 may be securely mounted from a pair of slightly modified saw horses 104.

In operation, the workpiece 72 may be supported from the extensions 42 and 44 after the upper surface of the slotted support table 70 has been properly aligned with the upper surfaces of the webs 62 of the extensions 42 and 44 and the fence 74 has been properly aligned with the front surfaces of the flanges 54 of the extensions 42 and 44. Thereafter, the saw 68 may be utilized to make any desired cuts.

It is, however, to be noted that a work person provided with the assembly 10 and having his own cut off saw 68 need only adjust the height of the spacing members 28, the front-to-rear shifted positions of the spacing members 28 and the bars 82 on the first usage of the assembly 20. Thereafter, the only steps needed to set up the assembly 10 will be the removal of the extensions 42 and 44 from the positions thereof illustrated in FIG. 6 and the remounting of the extensions 42 and 44 in the positions thereof illustrated in FIG. 9 as well as the placement of the saw 68 in position and the adjustment of the front fence 76. Upon completion of these tasks immediate usage of the assembly 10 and saw 68 is possible.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A miter saw support and extension assembly, said assembly including an elongated base member having upper and lower sides and being of a first predetermined length, said base member including opposite end portions disposed on opposite sides of a longitudinal center portion of said base member, a pair of elongated extension members each having a central portion, a pair of spacing members anchored to and spaced along each base member end portion and projecting above said upper side, each of said extension members including an upwardly facing surface and being removably anchored from a corresponding pair of said spacing members against shifting relative to said base member with each extension member in a predetermined elevated position relative to, disposed over and extending along the corresponding end portion of said base member and with said extension members coextensive with each other and including spaced apart adjacent ends to expose said center portion of said base member from above, said extension members including remote ends spaced appreciably outwardly of the ends of said base member, said center portion including means operative to removably stationarily support a horizontal cut off saw base, including a top surface, therefrom, independent of connections with said extension members, with the top surface of said saw base generally horizontally registered with said workpiece supporting surfaces and disposed between said adjacent ends, said extension members being removably anchored from said spacing members and repositionable in horizontal superposed positions with the longitudinal central portions of said extension members disposed one above the other and above said center portion of said base member and the ends of said extension members disposed over corresponding pairs of said spacing members, said extension members and spacing members including fastening means for releasably securing said repositioned extension members, in relative superposed relation, to at least one spacing member supported from each end portion of said base member.

2. The assembly of claim 1 wherein said base member comprises a downwardly opening channel member for receiving thereon lumber stock secured to each of a pair of horizontally spaced supports to mount said base member stationarily relative to said spaced supports in position spanning between said spaced supports.

3. The assembly of claim 1 wherein said extension members each include a front downwardly directed flange and a rear upwardly directed flange and a web extending between and connecting the front and rear flanges, said rear flanges comprising workpiece engaging fences.

4. The assembly of claim 3 wherein each rear flange terminates upwardly in a rearwardly directed horizontal flange having upwardly facing measuring indicia thereon.

5. The assembly of claim 1 wherein said center portion of said base member includes front and rear sides and a pair of laterally spaced front-to-rear extending clamp bars thereon, said clamp bars and center portion of said base member including means operative to releasably secure said clamp bars in relatively laterally shifted positions on said central portion.

6. The assembly of claim 5 wherein said front side of said central portion includes an upstanding fence for engagement with the front side of the base of a cut off saw supported from said central portion.

7. The assembly of claim 6 including means supporting said upstanding fence from said front side of said center portion of said base member for vertical adjustment relative thereto.

8. The assembly of claim 1 including variable thickness shims interposed between said spacing members and said end portions.

9. The assembly of claim 1 including means mounting said spacing members from said base end portions for adjustable positioning laterally of said end portions.

10. The assembly of claim 5 wherein said clamp bars are rearwardly convergent.

11. The assembly of claim 1 wherein at least one end portion of said base member includes an upwardly opening receptacle closed from above by the extension member supported from said one end portion of said base member when said extension members are mounted from said base member in longitudinally spaced coextensive positions and also closed from above by one of said extension members when said extension members are supported from said base member in said superposed positions.

12. The assembly of claim 1 wherein said extension members include front and rear downwardly and upwardly directed vertical flanges and a web extending between and interconnecting upper and lower margins of said front and rear flanges, said spacing members including front sides thereof outwardly from which locator pins project, said front vertical flanges including locator pin receiving apertures formed therein in which said pins are snugly received when said extension members are mounted from said spacing members in said coextensive positions.

13. A miter saw support and extension assembly, said assembly including a horizontally elongated base member of a first predetermined length, said base member incorporating opposite end portions disposed on opposite sides of a longitudinal center portion of said base member, said base member including upper and lower sides, a pair of horizontally elongated extension members having corresponding longitudinal central portions and including upper surfaces, said end portions including mounting means removably anchoring said extension members in longitudinally spaced, aligned and substantially coextensive positions from and overlying said end portions and with said upper surfaces in elevated positions relative to the upper side of said longitudinal center portion and said extension members supported against shifting relative to said base member, the spacing between said extension members exposing said base member center portion upper side from above, said extension members including remote ends spaced appreciably outwardly of the ends of said base member, said base member center portion including means operative to removably stationarily support a horizontal cut off saw base, including a top surface, therefrom, independent of connections with said extension members, with the top surface of said cut off saw base generally horizontally registered with said upper surfaces, said extension members being removable from said end portions and repositionable over said base member in horizontal superposed positions with the longitudinal central portions of said extension members disposed one above the other and above the center portion of said base member, said extension members and mounting means including fastening means for releasably securing said repositioned extension members in said superposed positions over said center portion of said base member.

14. The assembly of claim 13 wherein said base member comprises a downwardly opening channel member for receiving therein lumber stock secured to each of a pair of horizontally spaced supports to mount said base member stationarily relative to said spaced supports in position spanning between said spaced supports.

15. The assembly of claim 13 wherein said extension members each include a front downwardly directed flange and a rear upwardly directed flange and a web extending between and connecting the front and rear flanges, said rear flanges comprising workpieces engaging fences.

16. The assembly of claim 13 wherein said extension members each include a front downwardly directed flange and a rear upwardly directed flange and a web extending between and interconnecting said front and rear flanges, said spacing members including front sides thereof outwardly from which locator pins project, said front flanges including locator pin receiving apertures formed therein in which said pins are snugly received when said extension members are mounted from said spacing members in said coextensive positions.

17. The assembly of claim 13 wherein said center portion of said base includes front and rear sides and a pair of laterally spaced front-to-rear extending clamp bars thereon, said clamp bars and central portion including means operative to releasably secure said clamp bars in relatively laterally shifted positions on said central portion.

18. The assembly of claim 17 wherein said front side of said center portion of said base includes a upstanding fence for engagement with the front side of the base of a cut off saw supported from said central portion.

19. The assembly of claim 18 including means supporting said upstanding fence from said front side of said center portion for vertical adjustment relative thereto.

20. The assembly of claim 13 wherein said mounting means includes means mounting said extension members from said base member for adjustable positioning laterally of said base member.

* * * * *